United States Patent [19]

Tsuyama et al.

[11] Patent Number: 5,262,952
[45] Date of Patent: Nov. 16, 1993

[54] SLIP CONTROL SYSTEM FOR MOTOR VEHICLE

[75] Inventors: Toshiaki Tsuyama; Kazutoshi Nobumoto; Fumio Kageyama; Makoto Kawamura; Akira Sone, all of Hiroshima, Japan

[73] Assignee: Mazda Motor Corporation, Hiroshima, Japan

[21] Appl. No.: 658,859

[22] Filed: Feb. 21, 1991

[30] Foreign Application Priority Data

Feb. 22, 1990 [JP] Japan .................................. 2-41550

[51] Int. Cl.⁵ ............................................. B60K 41/04
[52] U.S. Cl. ..................... 364/426.03; 180/197; 364/424.1; 74/866
[58] Field of Search ................ 364/426.01, 426.02, 364/426.03, 424.1; 180/197; 74/866

[56] References Cited

U.S. PATENT DOCUMENTS

| 5,000,281 | 3/1991 | Nobamoto et al. | 180/197 |
| 5,001,943 | 3/1991 | Fujita | 74/866 |
| 5,047,940 | 9/1991 | Oraka et al. | 364/426.02 |
| 5,060,740 | 10/1991 | Nobamoto et al. | 180/197 |
| 5,103,348 | 4/1992 | Akiyama | 364/424.1 |

FOREIGN PATENT DOCUMENTS

3711913A1 10/1988 Fed. Rep. of Germany .
3927349A1 2/1990 Fed. Rep. of Germany .
4038823A1 6/1991 Fed. Rep. of Germany .

Primary Examiner—Thomas G. Black
Attorney, Agent, or Firm—Keck, Mahin & Cate

[57] ABSTRACT

A slip control system for a motor vehicle controls slips in driving wheels and includes a sensor for detecting a slip ratio of each driving wheel and a traction control system for decreasing a slip of each driving wheel by controlling a driving force transmitted to each driving wheel so that the slip ratio of each driving wheel is at least equal to a predetermined desired slip ratio when the slip ratio of the driving wheel becomes equal to the desired slip ratio. An automatic transmission control system controls an automatic transmission by using a first shift property for a normal operation, and a second shift property for a traction control operation which is adapted to determine a relative higher speed stage. A device is provided for switching the first shift property to the second shift property when the traction control operation is started by the traction control system.

5 Claims, 7 Drawing Sheets

SLIP CONTROL SYSTEM FOR MOTOR VEHICLE

BACKGROUND OF THE INVENTION

1. Field of the Invention

The present invention relates to a slip control system for a motor vehicle and, in particular, to a slip control system which includes an automatic transmission and a traction control system which controls a driving force transmitted to a driving wheel.

2. Description of the Related Art

There has been proposed a slip control system for a motor vehicle as shown in Japanese Patent Laid-Open Publication No. 58-16948, No. 57-22948, No. 62-231836 and the like. When an excessive slip is caused between driving wheels and road surfaces during starting and/or running operations, the slip control system decreases the excessive slip under a predetermined value to obtain driving forces which are transmitted to the road surfaces from the driving wheels and to obtain an optimal friction force between the driving wheels and the road surfaces. As a result, not only the starting and accelerating abilities but also the running and driving stabilities are improved.

The slip control system includes a traction control system. The traction control system includes an engine control system which decreases a degree of an opening of a throttle valve, delays an ignition timing, and cuts the supplying of fuel to the engine so as to decrease an excessive engine output, and/or a brake control system which increases brake fluid pressure so as to increase a braking force of driving wheels transitionally. When the vehicle is running on a low friction coefficient road surface, an excessive depression of the acceleration pedal causes an excessive slip in the driving wheels. At this time, the traction control system obtains a desired friction coefficient between the driving wheels and the road surfaces by decreasing the driving torque transmitted to the driving wheels. As a result, the traction control system decreases the excessive slip under a predetermined desired value.

However, when the driving torque is started to be decreased by the abovementioned slip control system, a responsibility of the driving torque to the accelerator operation is increased. As a result, there is a problem that a driver is not able to operate an accelerator easily.

SUMMARY OF THE INVENTION

It is therefore an object of the invention to provide a slip control system for a motor vehicle in which a driver is able to operate an accelerator easily when the driving torque is started to be decreased by the traction control system.

It is another object of the invention to provide a slip control system for a motor vehicle in which the slip of the driving wheel can be prevented from increasing immediately after the traction control system starts to decrease the driving force.

According to one aspect of the present invention, there is provided a slip control system for a motor vehicle controlling slips in driving wheels comprising means for detecting a slip ratio of each driving wheel, traction control means for decreasing a slip of each driving wheel by controlling a driving force transmitted to each driving wheel so that the slip ratio of each driving wheel is at least equal to predetermined desired slip ratio when the slip ratio of the driving wheel becomes equal to the desired slip ratio, means for controlling an automatic transmission by using a first shift property for a normal operation and a second shift property for a traction control operation which is adapted to determine a relative higher speed stage, and means for switching the first shift property to the second shift property when the traction control operation is started by the traction control means.

According to another aspect of the present invention, there is provided a slip control system for a motor vehicle controlling slips in driving wheels comprising means for detecting a slip ratio of each driving wheel, traction control means for decreasing a slip of each driving wheel by controlling a driving force transmitted to each driving wheel so that the slip ratio of each driving wheel is at least equal to predetermined desired slip ratio when the slip ratio of the driving wheel becomes equal to the desired slip ratio, means for controlling an automatic transmission by using a first shift property for a normal operation and a second shift property for a traction control operation which is adapted to determine a relative higher speed stage, means for switching the first shift property to the second shift property when the traction control operation is started by the traction control means, and means for prohibiting the automatic transmission from shifting up in a predetermined time after said traction control means starts to control the driving force.

The above and other objects and features of the present invention will be apparent from the following description by taking reference with accompanying drawings employed for preferred embodiments of the present invention.

DESCRIPTION OF THE PREFERRED EMBODIMENTS

Figure 1:
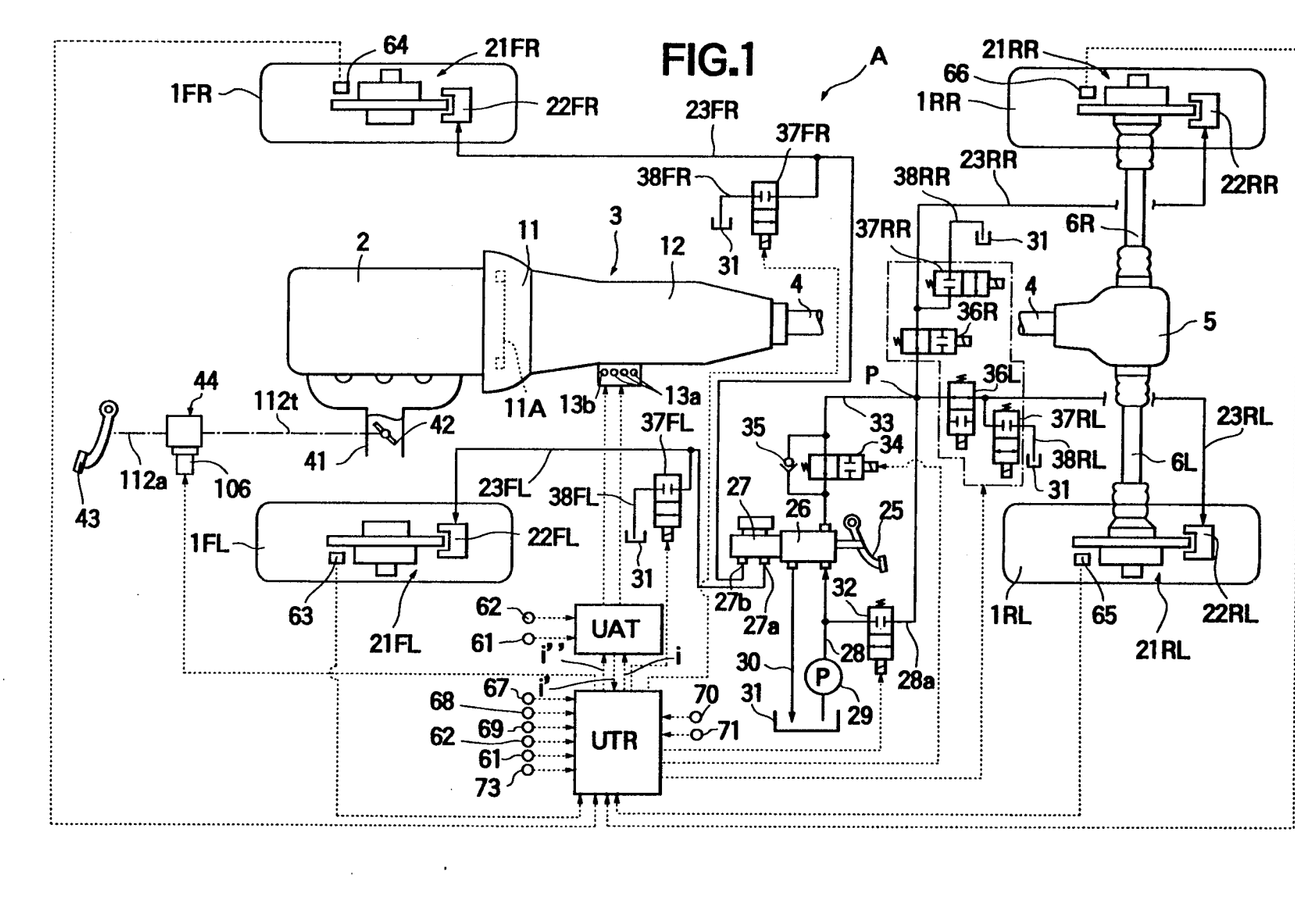
FIG. 1 is a general diagram of a slip control system in accordance with the present invention.

Referring to FIG. 1, there is shown a motor vehicle A having a slip control system in accordance with an embodiment of the present invention. The vehicle A has right and left front wheels 1FR, 1FL for driven wheels, and right and left rear wheels 1RR, 1RL for driving wheels.

A driving system includes an engine 2 disposed in the front portion of the vehicle, an automatic transmission 3 connected directly to a crankshaft of the engine 2, a propeller shaft 4 connected to an outputshaft of the automatic transmission 3, a differential 5 connected to the rear end portion of the propeller shaft 4, and driving shafts 6R, 6L extending from the differential 5 to right and left directions respectively and connected to the right rear wheel 1RR and the left rear wheel 1RL respectively.

A throttle valve 42 is provided in an intake path 41 of the engine 2 to control the amount of the intake air. The throttle valve 42 is connected to an acceleration pedal 43 through a throttle opening control mechanism 44 and an acceleration wire 112a. The throttle opening control mechanism 44 includes a motor 106 which decreases the opening of the throttle valve 42 transitionally.

The automatic transmission 3 comprises a torque converter 11 with a lockup clutch 11A operated by hydraulic pressure and a transmission 12 with a multiple-stage transmission gear mechanism. The transmission control operation is carried out by selecting combinations of magnetization and/or demagnetization of a plurality of solenoids 13a which are incorporated in a hydraulic control circuit for the automatic transmission 3. Connection and disconnection of the lockup clutch 11A is carried out by selecting magnetization or demagnetization of a solenoid 13b which is incorporated in the hydraulic control circuit.

The motor vehicle A includes a brake system. The brake system include brakes 21FR, 21FL, 21RR, 21RL provided respectively in wheels 1FR, 1FL, 1RR, 1RL, a tandem type master cylinder 27 connected through respective calipers (brake cylinder) 22FR, 22FL of the front wheel brakes 21FR, 21FL and brake conduits 23FR, 23FL, a hydraulic booster 26 connected through respective calipers 22RR, 22RL of the rear wheel brakes 21RR, 21RL and brake conduits 23RR, 23RL, and a brake pedal 25.

The master cylinder 27 supplies predetermined brake fluid pressure to the front wheels 1FR, 1FL. The master cylinder 27 changes the braking force which is applied to the brake pedal 25 and boosted by the booster 26 into the brake fluid pressure and then supplies the brake fluid pressure to the calipers 22FR, 22FL through brake conduits 23FR, 23FL connected respectively to first discharge outlet 27b and second discharge outlet 27a.

The brake conduits 23FR, 23FL include relief conduits 38FR, 38FL respectively whose end communicates to a reservoir 31. The relief conduits 38FR, 38FL include normal closed type magnetic proportional switching valves 37FR, 37FL which work as an outlet valve of an antilock braking system (ABS). FIG. 1 shows the condition that the switching valves 37FR, 37FL are switched to the full-closed positions.

The booster 26 boosts the braking force of the brake pedal 25 and transmits it to the master cylinder 27, and supplies brake fluid pressure in a booster chamber (not shown) to the calipers 22RR, 22RL through respective brake conduits 23RR, 23RL to which an accumulator (not shown) is connected. A pump 29 is connected to the booster 26 through a fluid pressure suppliing conduit 28. The pump 29 supplies the fluid in a reservoir 31 at a predetermined pressure to the conduit 28, which is maintained at a predetermined line pressure by the accumulator. A return conduit 30 is connected to the booster 26 so as to return the fluid from the booster 26 to the reservoir 31.

The booster chamber of the booster 26 is connected to a brake conduit 33 in which a normal opened type magnetic switching valve 34 is provided and a one way valve 35 is provided in parallel to the switching valve 34. FIG. 1 shows the condition that the switching valve 34 is switched to the full-opened position.

The brake conduit 33 branches into brake conduits 23RR, 23RL for the rear wheels 1RR, 1RL at a junction point P. A normal opened type magnetic proportional switching valve 36R is provided in the brake conduit 23RR and a normal opened type magnetic proportional switching valve 36L is provided in the brake conduit 23RL. The brake conduit 23RR, 23RL are provided respectively with relief conduits 38RR, 38RL which are branched on the down stream portion of the switching valves 36R, 36L and communicate to the reservoir 31 respectively. The relief conduits 38RR, 38RL are provided with normal closed type magnetic proportional switching valves 37RR, 37RL respectively which work as an outlet valve of an antilock braking system (ABS). FIG. 1 shows the condition that the switching valves 37RR, 37RL are switched to the full-closed positions.

At the junction point P, there is provided a branch conduit 28a communicating to the conduit 28. The branch conduit 28a is provided with a normal closed type switching valve 32. FIG. 1 shows the condition that the switching valve 32 is switched to the full-closed position.

The motor vehicle A further includes a control unit UAT for the automatic transmission 3, a slip control unit UTR which includes an antilock braking control system (hereinafter called ABS control system) and a traction control system. The solenoids 13a, 13b are controlled by the control unit UAT for the automatic transmission 3. When the brakes are operated, the ABS control system maintains desired friction force between each wheel 1FR, 1FL, 1RR, 1RL and the road surface to obtain the optimal braking force for the vehicle. When the excessive slip is caused in the rear wheels 1RR, 1RL when the vehicle is being run or started, the traction control system decreases the amount of excessive slip so as to obtain the desired driving force of the rear wheels 1RR, 1RL.

The control unit UAT for the automatic transmission receives detected signals from sensors 61, 62 in which the sensor 61 detects the opening of the throttle valve 42 and the sensor 62 detects the vehicle speed based on the rotation number of the propeller shaft 4. In accordance with these signals and stored transmission characteristics and lockup characteristics, the control unit UAT determines the transmission and lockup conditions, and then outputs the control signals to the solenoids 13a, 13b of the automatic transmission 3 to carry out the transmission and lockup controls.

Figure 2A:
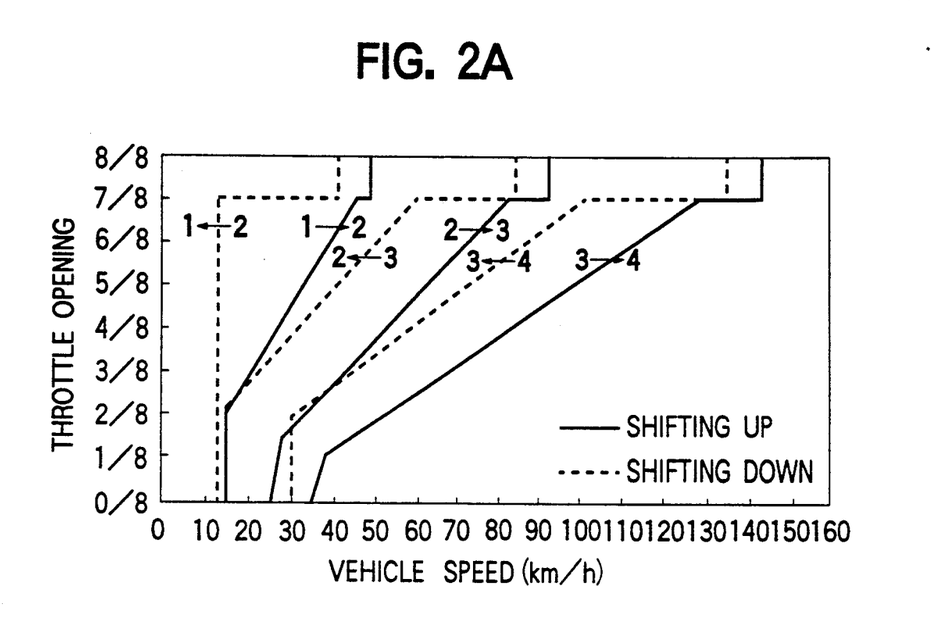
FIG. 2A is a shift map for the normal operation and FIG. 2B is a shift map for the traction control operation.
Figure 2B:
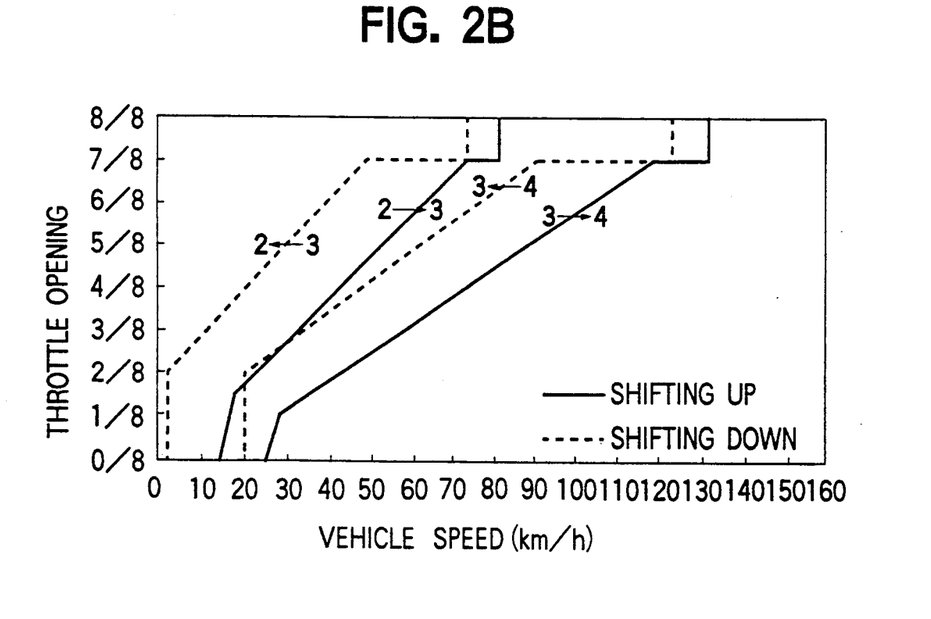

FIG. 2A is a shift map for the normal operation and FIG. 2B is a shift map for the traction control operation.

Referring to FIGS. 2A and 2B, the control unit UAT for the automatic transmission memorizes both the shift map for the normal operation shown in FIG. 2A and the shift map for the traction control operation shown in FIG. 2B. In the shift map for the traction control operation, in order to shift up at an early stage, a shift line between a first stage and a second stage is deleted and respective shift lines are offset toward the low speed direction. During the traction operation, the shift map for the nomal operation (hereinafter called a first shift map) is switched to the shift map for the traction control operation (hereinafter called a second shift map), and a shift determination is carried out based on the shift property in the second shift map.

To the slip control unit UTR are input various kinds of signals which are detected respectively by the throttle sensor 61, the vehicle speed sensor 62, wheel rotation speed sensors 63, 64, 65, 66 for detecting the wheel rotation speed of each wheel 1FR, 1FL, 1RR, 1RL, an acceleration opening sensor 67 for detecting the depression amount of the pedal 43, a motor rotation amount sensor 68 for detecting the rotation amount of the motor 106, a steering sensor 69 for detecting the angular steering amount of a steering wheel ( not shown ), a manual switch 70 for selecting control modes, a brake switch 71 for detecting the depression of the pedal 25, and a G sensor 73 for detecting a reduction speed of the vehicle.

The control unit UTR further includes an input interface for receiving the signals from the abovementioned sensors, a microcomputer comprising a ROM in which control programs and various kinds of control maps and the like are stored, a RAM in which various kinds of memories necessary for carrying out the control are stored, a CPU, an output interface for outputing control signals to the control unit UAT, and control circuits for operating the valves 32, 34, 36R, 36L, 37FR, 37FL, 37RR, 37RL and the motor 106.

In the control unit UTR, the ABS control system detects slip conditions of each wheel 1FR, 1FL, 1RR, 1RL based on the difference between an estimated vehicle speed and the wheel rotation speed of each wheel detected respectively by each sensor 63, 64, 65, 66. The estimated vehicle speed is computed based on the reduction speed of the vehicle detected by the G sensor 73. When the ABS control system determines that any one of the wheels 1FR, 1FL, 1RR, 1RL is in the lock condition, the system controls the openings of the switching valves 37FR, 37FL, 37RR, 37RL and decreases the line fluid pressure in the brake conduit(s) 23FR, 23FL, 23RR, 23RL each wheel of which is determined to be in the lock condition so as to cancel the lock condition. For example, in the braking operation, the ABS control system detects the excessive slip in the front wheel 1FL and then carries out a duty control on the switching valve 37FL so as to increase the opening of the switching valve 37FL so that the fluid pressure in the brake conduit 23FL and the caliper 22FL is decreased, and then the brake fluid pressure in the brake 21FL is decreased transitionally. The slip in the front wheel 1FL is controlled so that the front wheel 1FL is able to obtain desired friction force against the road surface and an optimal braking force.

In the control unit UTR, the traction control system carries out an engine control and a brake control. The engine control is carried out by controlling the rotation amount of the motor 106 in the throttle opening control mechanism 44 to decrease the output of the engine 2 transitionally when the excessive slip is caused in the driving wheels ( the rear wheels 1RR, 1RL ) at the time the vehicle is being started or run. The brake control is carried out by controlling the valves 32, 34 in open and close positions and controlling the degree of opening of the valves 36R, 36L, 37RR, 37RL so as to control the value of the brake fluid pressure. By the engine control operation and the brake control operation , driving torques transmitted to the rear wheels 1RR, 1RL are decreased and the slips in the rear wheels 1RR, 1RL are controlled.

In the engine control operation, the throttle opening control mechanism 44 decreases the degree of the opening of the throttle valve 42 less than the acceleration opening of the pedal 43 to decrease the output of the engine 2.

Figure 3A:
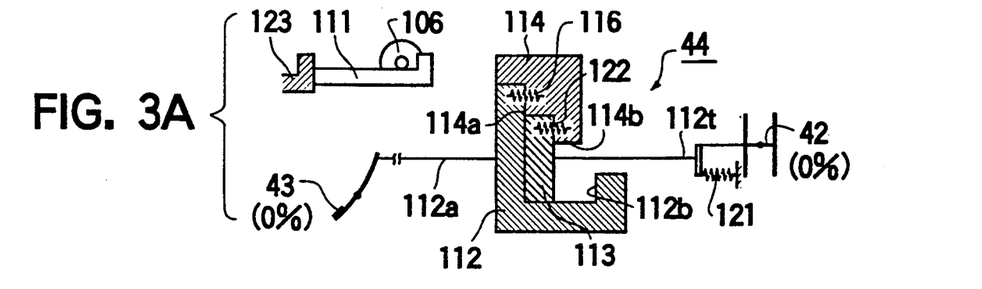
FIG. 3A through 3D are schematic views showing the operation of a throttle opening control mechanism.

Referring to FIG. 3A, the throttle opening control mechanism 44 will be described hereinafter with reference to FIGS. 3A~3D. The throttle opening control mechanism 44 includes an acceleration pedal side lever 112 connected to the acceleration pedal 43 through an acceleration wire 112a, a throttle valve side lever 113 connected to the throttle valve 42 through a throttle wire 112t, an abutting lever 114 having an abutting portion 114a for abutting on the right side of the lever 112 and an abutting portion 114b for abutting on the right side of the lever 113, a driving lever 111 provided to be driven to the left and to the right, the motor 106 driving the lever 111, and a stopper 123 restricting the leftward movement of the lever 111 within a predetermined amount.

The lever 113 is biased to the right, which is the direction for closing the throttle valve 42, by a return spring 121. Disposed between the lever 112 and the lever 114 is a spring 116 for biasing the abutting portion 114a to abut it on the lever 112. In the same way, disposed between the lever 113 and the lever 114 is a spring 122 for biasing the abutting portion 114b to abut it on the lever 113. The biasing force of the spring 116 is set larger than those of the spring 122 and the return spring 121.

The throttle opening control mechanism 44 constructed as described above operates as follows.

Figure 3B:
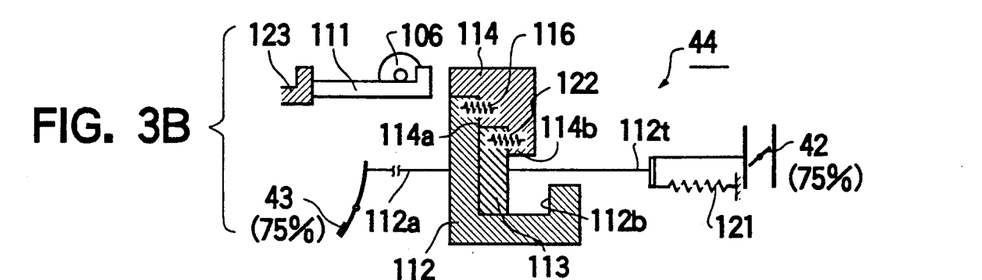

First, there is a condition wherein the lever 111 abuts against the stopper 123. In this condition, the levers 112, 113 and 114 are made integral under the biasing force of the springs 116 and 122 as shown in FIGS. 3A, 3b, so that the degree of opening of the throttle obtained, hereinafter called a throttle opening, is proportional to the degree of opening of the accelerator, hereinafter called an accelerator opening. That is, the throttle opening varies within a range of 0~100% while the accelerator opening varies within a range of 0~100%. FIG. 3A shows a condition wherein the throttle opening is 0%, that is, the accelerator opening is 0%, and FIG. 3B shows a condition wherein the throttle opening is 75%, that is, the accelerator opening is 75%. In the condition of FIG. 3B, there remains a distance between the levers 111 and 114, which is necessary for making the throttle opening vary from 75% to 100%. Thus, the levers 111 and 114 abut against each other when the throttle opening becomes 100%, that is, the accelerator opening becomes 100%.

Figure 3C:
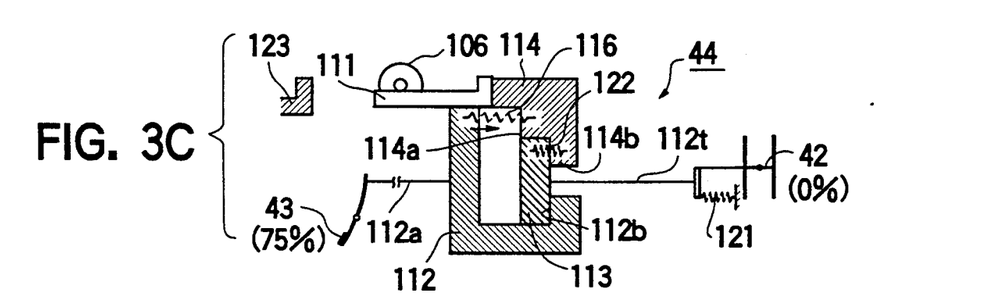
Figure 3D:
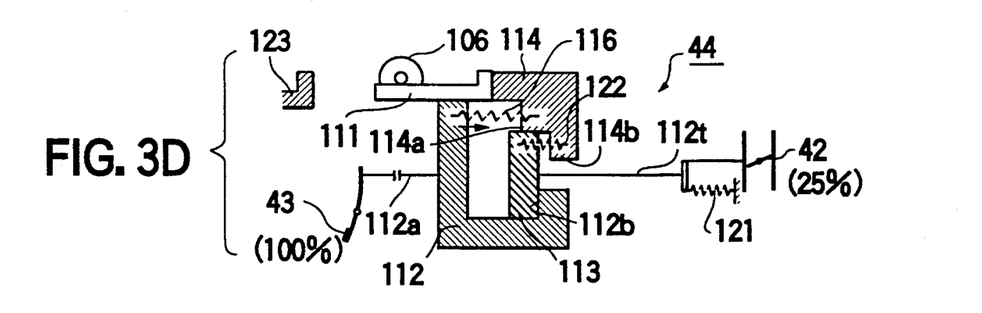

When the lever 111 is driven to the right by the motor 106 in the condition shown in FIG. 2B, the lever 114 is moved to the right against the spring 116 as shown in FIG. 3C. Thus, the throttle opening becomes small, while the accelerator opening remains as it is.

In FIG. 3C, the throttle opening is 0%, that is, the throttle is completly closed, while the accelerator opening is 75%. In this condition, the abutting portion 112b of the lever 112 abuts against the lever 113.

When the accelerator opening is made 100% in the condition shown in FIG. 3C, the lever 112 is moved to the left, and accordingly the lever 113 is moved to the left by the abutting portion 112b. Thus, the throttle opening changes from 0% shown in FIG. 3c to 25% shown in FIG. 3D.

As is clearly understood from the above description, even if the lever 111 becomes stuck in the condition shown in FIG. 3C, the throttle valve 42 can be opened to an opening of 25% by making the accelerator opening 100%, so that the vehicle A can be driven to a repair shop.

In the brake control operation, by the switching valve 34 being switched to the full-closed position, and the switching valve 32 being switched to the full-opened position, the fluid pressure supply conduit 28 increases the line pressure in the brake conduits 23RR, 23RL, and then the line pressure is manintained by the switching valves 36R, 36L being switched to the closed position, or the line pressure is released by the switching valves 37RR, 37RL being switched to the open position.

Figure 4:
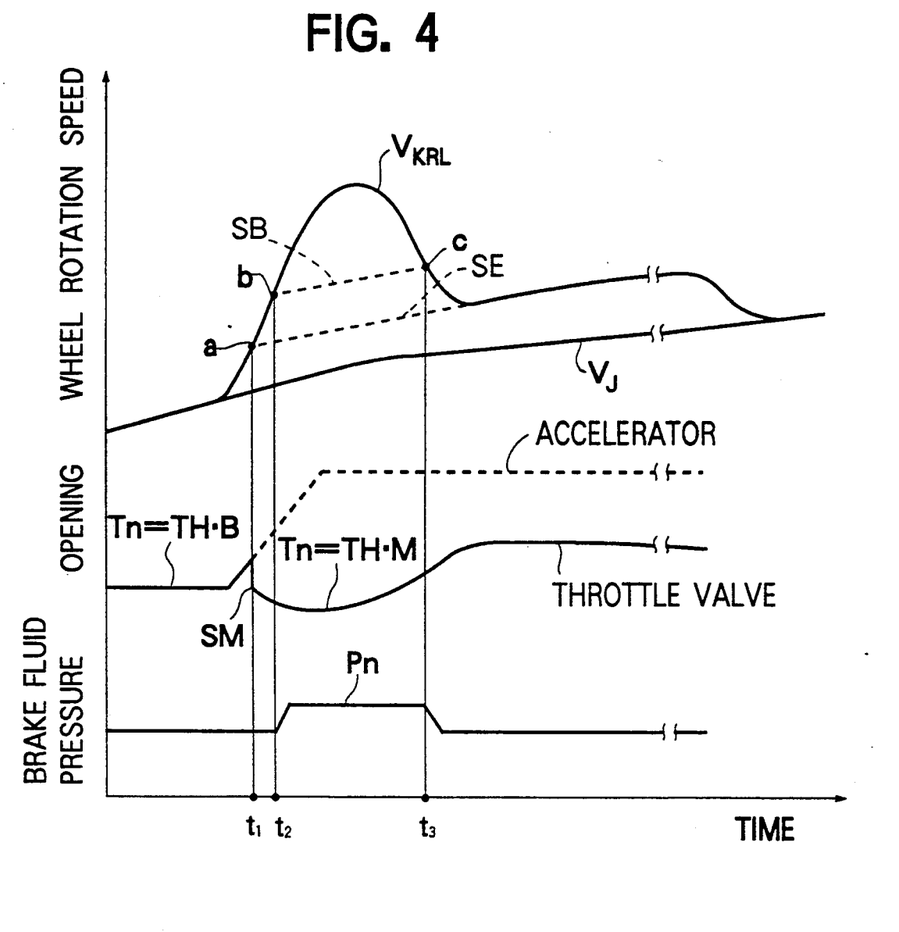
FIG. 4 is a time chart showing an outline of the slip control.
Figure 5:
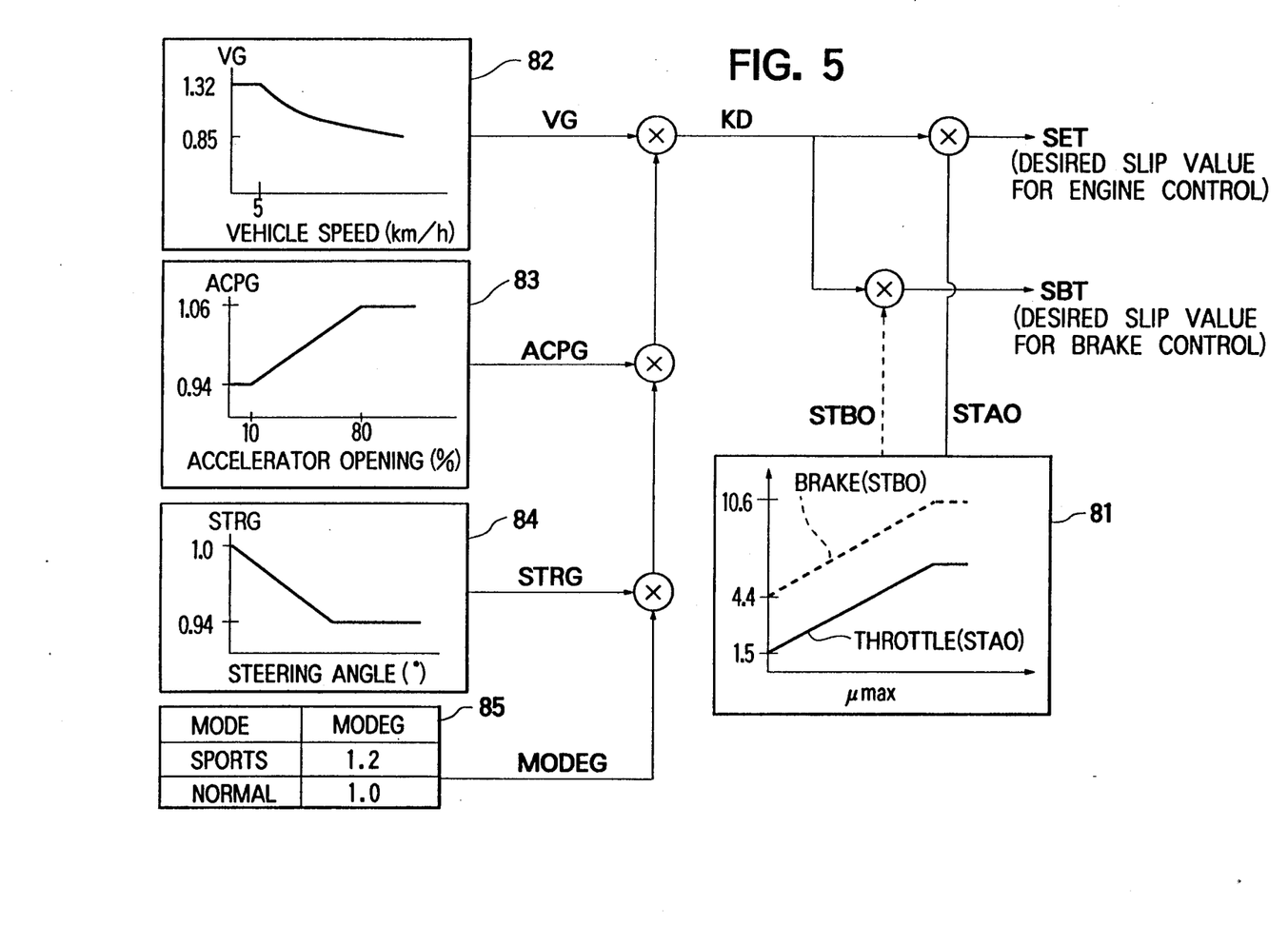
FIG. 5 is a block diagram showing a circuit which determines a desired slip value for the brake control operation and a desired slip value for the engine control operation to set both desired slip values of the rear wheels.
Figure 6:
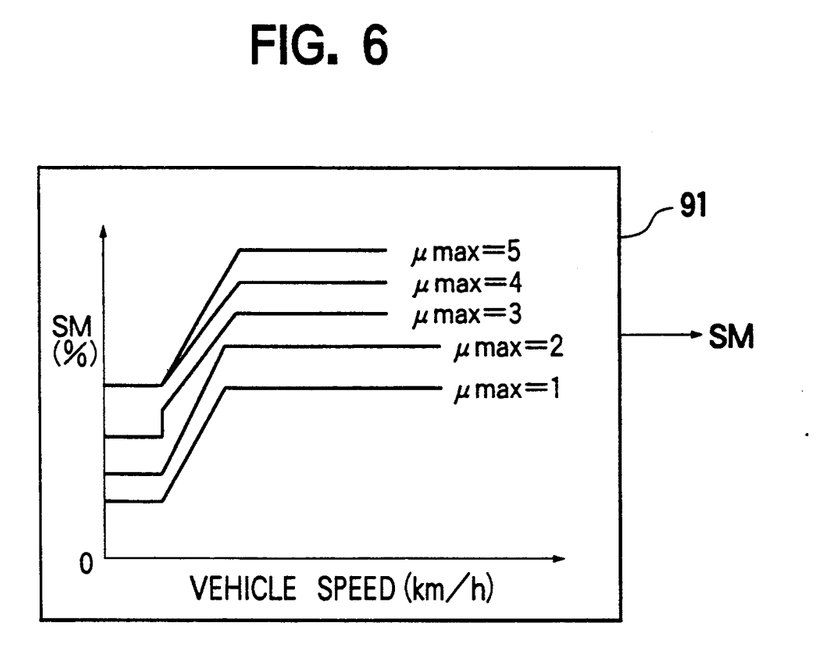
FIG. 6 is a diagram showing the lower limit of the throttle opening determined by the traction control system.

FIG. 4 is a time chart which shows a relationship between the general vehicle wheel rotation characteristic of the rear wheels in the traction control operation, and the engine control operation and brake control operation by the traction control system. FIG. 5 is a block diagram showing a circuit determining a desired slip value for the brake control operation and a desired slip value for the engine control operation to set both desired slip values of the rear wheels. FIG. 6 is a diagram showing the lower limit of the throttle opening determined by the traction control system.

FIG. 4 shows the general vehicle wheel rotation characteristic of the driving wheel, for example rear left wheel 1RL, in the traction control operation. The other driving wheel or rear right wheel 1RR has substantialy the same characteristic as the rear left wheel 1RL.

In FIG. 4, $V_{KRL}$ shows the wheel rotation speed of the driving wheel or the rear left wheel 1RL in the slip control operation, and $V_J$ shows the wheel rotation speed of the driven wheel or the average value of the front wheels 1FR, 1FL. And a threshold a and a threshold b are shown. The threshold a corresponds to a basic desired slip ratio SE employed in the engine control operation which controls the slip ratio of the rear wheel 1RL by controlling the opening of the throttle valve. The threshold b corresponds to a basic desired slip ratio SB employed in the brake control operation which controls the slip ratio of the rear wheel 1RL by controlling the pressure of the brake fluid. The threshold b is set as a larger value than the threshold a.

The slip ratio $S_{RL}$ of the rear wheel 1RL is calculated as follows:

$$\text{Slip Ratio } S_{RL} = \frac{V_{KRL} - V_J}{V_{KRL}}$$

The basic desired slip ratios SE, SB are calculated respectivly as follows:

$$SE = \frac{SET}{V_J}$$

$$SB = \frac{SBT}{V_J}$$

where SET and SBT show respectivly a desired slip value for the engine control operation and a desired slip value for the brake control operation, both of which are set in the rear wheels 1RL, 1RR equally.

The desired slip value SET for the engine control operation and the desired slip value SBT for the brake control operation are set so that the rear wheels 1RL, 1RR obtain the predetermined driving force mainly when the vehicle is running straight. Specifically the desired slip values SET and SBT are determined based on parameters such as the maximum friction coefficient μmax of the road surface, the vehicle speed, the accelerator opening, the steering angle, and the running mode selected by the mode selecting switch 70 as shown in FIG. 5.

As shown in FIG. 5, the control unit UTR has a map where a basic value STBO of the desired slip value SBT and a basic value STAO of the desired slip value SET are stored respectivly. Their parameters is a maximum friction coefficient μmax of the road surface which is estimated based on the larger of the slip ratios $S_{RL}$ or $S_{RR}$ of the respective rear wheels and the driving wheel rotation speed $V_J$. In the map, the basic value STBO is set as a larger value than the basic value STAO. Abovementioned desired slip values SET and SBT are obtained respectively by multiplying the basic values STAO, STBO by a correction gain KD. The correction gain KD is obtained by multiplying a gain coefficient VG by gain coefficients ACPG, STRG, MODEG. The gain coefficient VG is provided so as to obtain the stability of the vehicle in accordance with the increase of the vehicle speed and is given by a map 82 as a function of the vehicle speed. The gain coefficient ACPG is provided so as to obtain the driving force in accordance with the acceleration demand of the driver and is given by a map 83 as a function of the accelerator opening. The gain coefficient STRG is provided so as to obtain the stability of the vehicle in the steering operation and is given by a map 84 as a function of the steering angle. The gain coefficient MODEG is given by a table 85 and is manually selected from two modes, i.e., sports mode, and normal mode by the driver.

Referring back to FIG. 4, before the time $t_1$, the slip is small so that the throttle opening Tn is controlled under the basic throttle opening TH·B which is proportional to the accelerator opening by the lever 111 of the throttle opening control mechanism 44 being maintained at the position shown in FIG. 3A and FIG. 3B. At this time, the pressure of the brake fluid supplied to the brakes 21FR~21RL are decreased by switching valves 32, 34, 36R, 36L and 37FR~37RL being maintained at the normal positions respectively.

At the time $t_1$ when the driving wheel rotation speed $V_{KRL}$ increases to the threshold a of the basic desired slip ratio SE, the engine control operation by the slip control system is started. In the engine control operation, the traction control system in the slip control unit UTR carries out a feedforward control so as to drop the throttle opening down to a lower limit control value SM by the lever 111 of the mechanism 44 being moved forwardly by the motor 106.

Referring to FIG. 6, the lower limit control value SM of the throttle opening is stored in a map, whose parameters are the vehicle speed and the maximum friction coefficient μmax of the road surface, and is determined based on these parameters. The maximum friction coefficient μmax varies from 1 to 5 where the smallest is equal to 1 and the largest is equal to 5. When the road surface has relativly small maximum friction coefficient μmax, a relative large lower limit control value SM is provided so as to decrease the output of the engine 2 rapidly. And when the road surface has a relative large maximum friction coefficient μmax, a relative small lower limit control value SM is provided so as to prevent the vehicle from stalling caused by the overreduction of the output of the engine 2.

After the throttle opening is dropped down to the lower limit control value SM, the traction control system carries out a feedback control of the opening of the throttle valve 42 so that the slip ratio $S_{RL}$ of the rear wheel 1RL becomes the desired slip ratio SE for the engine control operation. The feedback control is carried out by controlling the rotation of the motor 106 in the mechanism 44 so that the throttle opening is controlled under TH·M as shown in FIG. 4.

Referring back to FIG. 4, after the time $t_1$, the driving wheel rotation speed $V_{KRL}$ of the rear wheel 1RL is still increasing against the driven wheel rotation speed $V_J$, while the engine control is operated. At the time of $t_2$, the driving wheel rotation speed $V_{KRL}$ increases to the threshold b of the basic desired slip ratio SB. At this time, the brake control operation of the traction control is started so that the slip ratio $S_{RL}$ of the rear wheel 1RL is equal to the basic desired slip ratio SB. Namely, in the brake control operation, the slip control unit UTR of the traction control system controls the switching valves 32, 34, 36RR, 36RL so that the brake fluid pressure of the brake 21RL of the rear wheel 1RL is increased to the pressure Pn$_{RL}$ and then the pressure Pn$_{RL}$ is maintained.

After the time $t_1$, both engine control and brake control are operated to decrease the slip of the rear wheel 1RL. When the driving wheel rotation speed $V_{KRL}$ is decreased under the threshold c of the basic desired slip ratio SB for the brake control at the time of $t_3$, the slip control unit UTR stops the brake control operation by opening the switching valve 37RL and decreasing the brake fluid pressure. Meanwhile the engine control operation is still being carried out until there is no possibility that the slip ratio $S_{RL}$ increases or the acceleration opening is reduced to zero.

The wheel rotation characteristic of the rear left wheel 1RL is described above, with reference to FIG. 4, and in the rear right wheel 1RR, the engine control and brake control by the traction control operation is similarly carried out based on the desired slip ratio SE and SB in which the characterisric of the driving wheel rotation speed $V_{KRR}$ of the rear left wheel 1RL is as same as that of the rear left wheel 1RL shown in FIG. 4.

When the slip of either the rear right wheel 1RR or the rear left wheel 1RL is increased at a early stage, the engine control operation which is carried out equally in both rear wheels is started at the time the slip ratio $S_{RR}$ or $S_{RL}$ of the rear wheel 1RR or 1RL, or the average of the slip ratios $S_{RR}$ and $S_{RL}$ is equal to the desired slip ratio SE for the engine control. The brake contol operation is carried out in the rear right wheel and rear left wheel independently. Therefore, when the slip ratios of respective rear wheels 1RR, 1RL are equal to the desired slip ratio SB for the brake control, the brake contol operation is carried out respectively so that the brake fluid pressure in the rear wheels 1RR, 1RL are increased and the slip ratios $S_{RR}$ and $S_{RL}$ of the rear wheels 1RR and 1RL are decreased under the desired slip ratio SB respectively.

When the traction control system starts the engine control operation, the automatic transmission control unit UAT switches the first shift map for the normal operation to the second shift map for the traction control operation and thus the shifting up can be carried out at an early stage.

In accordance with an embodiment of the invention, when the automatic transmission control unit UAT determines the shifting up of the transmission 3 based on the second shift map after the first shift map is switched to the second shift map, the slip control unit UAT prohibits the control unit UAT from shifting up the automatic transmission 3 during a predetermined time.

Figure 7:
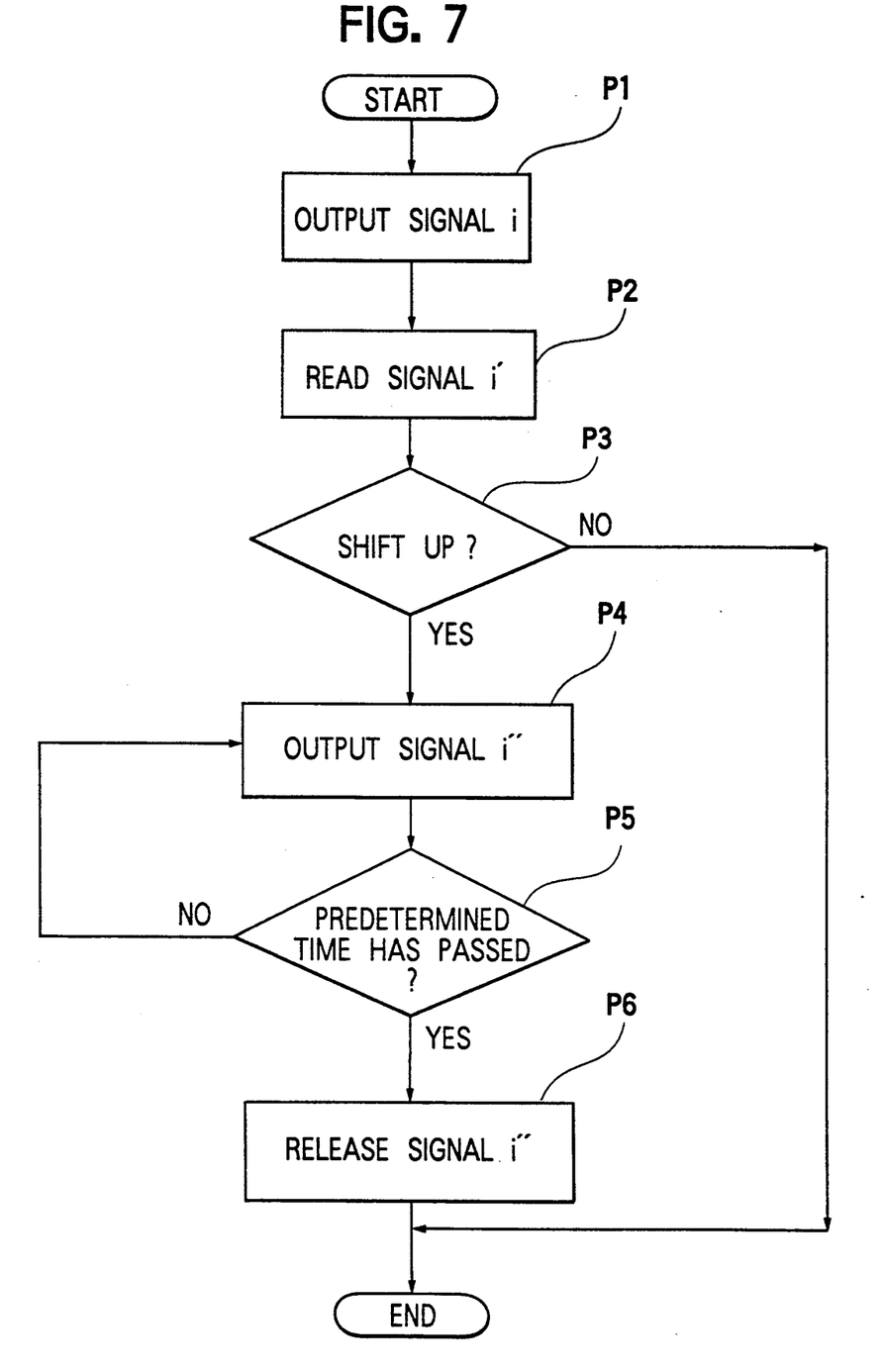
FIG. 7 is a flow chart showing a procedure of prohibiting from shifting up by a slip control unit UTR.

FIG. 7 is a flow chart showing a procedure for prohibiting shifting up by the slip control unit UTR.

Referring to FIG. 7, the slip control unit UTR outputs a signal i showing the start of the engine control operation ( shown in FIG. 1 ) to the automatic transmission control unit UAT, and the automatic transmission control unit UAT switches the first shift map for the normal operation shown in FIG. 2A to the second shift map for the traction operation shown in FIG. 2B based on the signal i from the slip control unit UTR by which the control unit UAT determines the shift stage of the automatic transmission 3 based on the second shift map ( P2 ). When the slip control unit UTR recognizes, based on a signal i' sent from the automatic transmission control unit UTA ( shown in FIG. 1 ), that the control unit UTA has determined the shifting up in the automatic transmission 3 ( P2, P3 ), the control unit UTR prohibits the control unit UAT from shifting up in the automatic transmission 3 during a predetermined time by outputting a signal i" to the control unit UTA ( P4, P5 ). Then the control unit UTR releases the signal i" for prohibiting shifting up of the automatic transmission 3 after the predetermined time has passed ( P6 ).

Thus after the signal i" for prohibiting shifting up of the automatic transmission 3 is released, the transmission 3 is shifted up by outputing a signal to the solenoid 13b of the transmission 3 so that the responsibility of the driving torque to the accelerator operation is decreased. As a result, the driver can operates the accelerator easily.

In accordance with the abovementioned embodiment of the invention, the increase of the slip of the rear wheels 1RR, 1RL, which is caused immediately after the traction control system starts to decrease the driving torque and the control unit UTA shifts up the transmission, can be controlled or prevented.

In the abovementioned embodiment, the shifting up which is determined based on the second shift map is prohibited during the predetermined time. However, the switching of the first shift map to the second shift map in the automatic transmission control unit UTA may be prohibited during a predetermined time.

In the abovementioned embodiment, the slip control unit UTR prohibits shifting up in the automatic transmission during the predetermined time by using the abovementioned signal "i". However, the automatic transmission control unit UAT by itself may prohibit the switching of the first shift map to the second shift map or the shifting up in the transmission during a predetermined time.

The present invention may be applied to a slip control system for a motor vehicle with no ABS control system.

In the engine control operation, the engine output may be decreased by the variable control of the ignition timing and/or the cutting of the supplying of the fuel to the engine. Further, the combination of this control operation in which the engine output is decreased by the variable control of the ignition timing and/or the cutting of the supplying of the fuel to the engine and the control operation in which the engine output is decreased based on the throttle opening described in the above embodiment may be employed.

The control of the throttle valve may be carried out by the stepping motor instead of the throttle opening control mechanism.

Other definitions of the slip ratio may be employed if they correspond to the abovementioned slip ratio substantially.

What is claimed is:

1. A slip control system for a motor vehicle controlling slips in driving wheels comprising:

means for detecting a slip ratio of each driving wheel;

traction control means for decreasing a slip of each driving wheel by controlling a driving force transmitted to each driving wheel so that the slip ratio of each driving wheel is at least equal to a predetermined desired slip ratio when the slip ratio of the driving wheel becomes equal to the desired slip ratio;

means for controlling an automatic transmission by using a first shift property for a normal operation and a second shift property for a traction control operation which is adapted to determine a relative higher speed stage;

means for switching the first shift property to the second shift property when the traction control operation is started by the traction control means; and means for prohibiting the automatic transmission from shifting up in a predetermined time after said traction control means starts to control the driving force.

2. A slip control system for a motor vehicle in accordance with claim 1 in which said means for prohibiting includes means for delaying the shifting up of the automatic transmission during the predetermined time when said means for controlling said automatic transmission determines the shifting up to be based on the second shift property.

3. A slip control system for a motor vehicle in accordance with claim 1 in which said first shift property includes a first shift map and said second shift property includes a second shift map.

4. A slip control system for a motor vehicle in accordance with claim 3 in which said second shift map includes no shift line from a first stage to a second stage.

5. A slip control system for a motor vehicle in accordance with claim 1 in which said prohibiting means includes means for delaying the switching from the first shift property to the second shift property in the predetermined time.

* * * * *